(12) United States Patent
Mourlam

(10) Patent No.: US 10,913,643 B1
(45) Date of Patent: Feb. 9, 2021

(54) DUAL BOOM LOAD MONITORING

(71) Applicant: Altec Industries, Inc., Birmingham, AL (US)

(72) Inventor: Timothy J. Mourlam, Kansas City, KS (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/678,615

(22) Filed: Nov. 8, 2019

(51) Int. Cl.
*B66F 17/00* (2006.01)
*G01L 1/02* (2006.01)
*B66F 11/04* (2006.01)

(52) U.S. Cl.
CPC .............. *B66F 17/006* (2013.01); *G01L 1/02* (2013.01); *B66F 11/044* (2013.01)

(58) Field of Classification Search
CPC .. B60Q 9/00; B66F 11/00; B66F 11/04; B66F 11/044; B66F 11/046; B66F 17/00; B66F 17/006; F15B 19/00; F15B 19/005; F15B 2211/00; F15B 2211/80; F15B 2211/857; G01C 9/00; G01L 13/00; G01L 5/00; G01L 5/0061; G01M 5/00; G01M 5/0025
See application file for complete search history.

(56) References Cited

U.S. PATENT DOCUMENTS

| 5,160,055 A | 11/1992 | Gray |
| 5,557,526 A | 9/1996 | Anderson |
| 10,427,926 B2 | 10/2019 | Mourlam |
| 2008/0217279 A1* | 9/2008 | Gelies ..................... B66C 13/40 212/278 |

* cited by examiner

*Primary Examiner* — Charles J Han
(74) *Attorney, Agent, or Firm* — Erise IP, P.A.

(57) ABSTRACT

A dual boom monitoring system includes a first sensor that monitors a position of a first boom and a second sensor that monitors a position of a second boom. A third sensor monitors a hydraulic fluid pressure of a first boom hydraulic cylinder configured to pivotally raise and lower the first boom with respect to a base. A fourth sensor monitors a hydraulic fluid pressure of an second boom hydraulic cylinder configured to pivotally raise and lower the second boom with respect to the first boom. A controller is communicatively coupled with the sensors and configured to perform the steps of a dual boom monitoring method. The method is used to determine positions and loads on the first boom and the second boom based on data received from the sensors. The method reduces cones of uncertainty for various boom positions to improve accuracy and reliability of load monitoring.

18 Claims, 6 Drawing Sheets

DUAL BOOM LOAD MONITORING

BACKGROUND

1. Field

Embodiments of this disclosure relate generally to safety systems for use with various other systems. More specifically, embodiments of this disclosure relate to systems for establishing safe operating limits associated with devices for moving a load.

2. Related Art

Various safety-monitoring systems provide monitoring of a device operated under certain conditions and provide warnings to an operator when the operation is deemed to be unsafe.

For example, U.S. Pat. No. 5,557,526 to Anderson provides a method for monitoring load on a first boom component and recording occurrences where the first boom component has been loaded to a value exceeding a maximum value.

U.S. Pat. No. 10,427,926 to Mourlam discloses a boom load monitoring system that includes at least one sensor for providing information to a controller about a real-time load level associated with an aerial device having an extendable boom. The controller determines if a load limit has been reached and initiates an alert to a user of the aerial device that a load limit has been reached to avoid unsafe situations.

SUMMARY

Embodiments of this disclosure provide a dual boom load monitoring system and method. The dual boom load monitoring system includes a plurality of sensors that provide information to a controller about a real-time orientation and motion state of an aerial device with an extendable arm having a two-stage boom (e.g., an upper boom and a lower boom). The controller determines if a load limit is being approached and provides a signal or other indication to alert a user of the aerial device for helping to avoid unsafe situations that may otherwise damage equipment or harm personnel. The dual boom load monitoring system and method provide improved resolution and accuracy compared to previous boom load monitoring systems and methods.

A first embodiment is directed to a monitoring system for a boom having a first boom segment and a second boom segment. The system includes a first sensor that monitors a position of the first boom segment and a second sensor that monitors a position of the second boom segment. A first boom hydraulic cylinder is disposed between the first boom segment and a base supporting the first boom segment. The first boom hydraulic cylinder is configured to pivotally raise and lower the first boom segment with respect to the base. A second boom hydraulic cylinder is disposed between the first boom segment and the second boom segment. The second boom hydraulic cylinder is configured to pivotally raise and lower the second boom segment with respect to the first boom segment. A third sensor monitors a hydraulic fluid pressure of the first boom hydraulic cylinder. A fourth sensor monitors a hydraulic fluid pressure of the second boom hydraulic cylinder. A controller has a non-transitory memory and a processor for processing software instructions stored in the memory. The controller is communicatively coupled with the first sensor, the second sensor, the third sensor, and the fourth sensor. The controller performs the steps of: determining positions of the first boom segment and the second boom segment based on data received from the first sensor and the second sensor, respectively; determining whether the positions are approaching a cone of uncertainty, the cone of uncertainty comprising a portion of an operating range of the boom in which a change in a load applied to the boom does not produce a corresponding change in the hydraulic fluid pressure; when inside the cone of uncertainty, determining an effective load on the boom based on hydraulic fluid pressure of the first boom hydraulic cylinder from the third sensor; and, when outside the cone of uncertainty, determining the effective load on the boom based on hydraulic fluid pressure of the second boom hydraulic cylinder from the fourth sensor.

A second embodiment is directed a dual boom load monitoring method for an aerial device having a first boom and a second boom. The method includes monitoring a position of a first boom via a first sensor and monitoring a position of a second boom via a second sensor. The method further includes determining a first boom joint angle and a second boom joint angle based on data received by the controller from the first sensor and the second sensor, respectively; determining states of motion of the first boom and the second boom based on the first boom joint angle and the second boom joint angle over time; determining whether one of the first boom or the second boom is inside one or more cones of uncertainty; when one of the first boom or the second boom is inside the one or more cones of uncertainty, determining an effective load for the aerial device based on hydraulic fluid pressure of the first boom hydraulic cylinder from a third sensor; and, when both of the first boom and the second boom are outside the one or more cones of uncertainty, determining an effective load for the aerial device based on hydraulic fluid pressure of the second boom hydraulic cylinder from a fourth sensor.

A third embodiment is directed to a dual boom load monitoring system for monitoring loads applied to a multi-segment boom having at least a lower boom and an upper boom. A first sensor monitors a lower boom joint angle, the lower boom joint angle is between the lower boom and a base that supports the lower boom. A second sensor monitors an upper boom joint angle, the upper boom joint angle is between the lower boom and the upper boom. A lower boom hydraulic cylinder is disposed between the lower boom and the base and configured to pivotally raise and lower the lower boom with respect to the base. An upper boom hydraulic cylinder is disposed between the lower boom and the upper boom and configured to pivotally raise and lower the upper boom with respect to the lower boom. A third sensor monitors a hydraulic fluid pressure of the lower boom hydraulic cylinder. A fourth sensor monitors a hydraulic fluid pressure of the upper boom hydraulic cylinder. A controller has a non-transitory memory and a processor for processing software instructions stored in the memory. The controller is communicatively coupled with the first sensor, the second sensor, the third sensor, and the fourth sensor, wherein the controller performs the steps of: determining an effective load based on information from at least one of the third sensor or the fourth sensor and a correction for friction; determining a load limit based on the lower boom joint angle and the upper boom joint angle; and, determining a load percentage based on the effective load and the load limit. An alert indicator is communicatively coupled to the controller for producing an alert when the load percentage exceeds a predetermined maximum load percentage.

Another embodiment may be directed to an aerial device, including a base, a boom, and a dual boom load monitoring system. Still another embodiment may be directed to a grappler, including grappler arms connected to a moveable arm or boom, and a dual boom load monitoring system. Yet another embodiment may be directed to a tree-trimming device including grappler arms for grabbing a tree limb and shearing blades for cutting the tree limb, with the grappler arms and shearing blades mechanically coupled to a telescoping, angling, and rotating boom for positioning the grappler arms and shearing blades to trim tree limbs in combination with a dual boom load monitoring system. Yet a further embodiment may be directed to a vehicle, including a boom and a dual boom load monitoring system. Other embodiments will also be discussed throughout the present disclosure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

Figure 1:
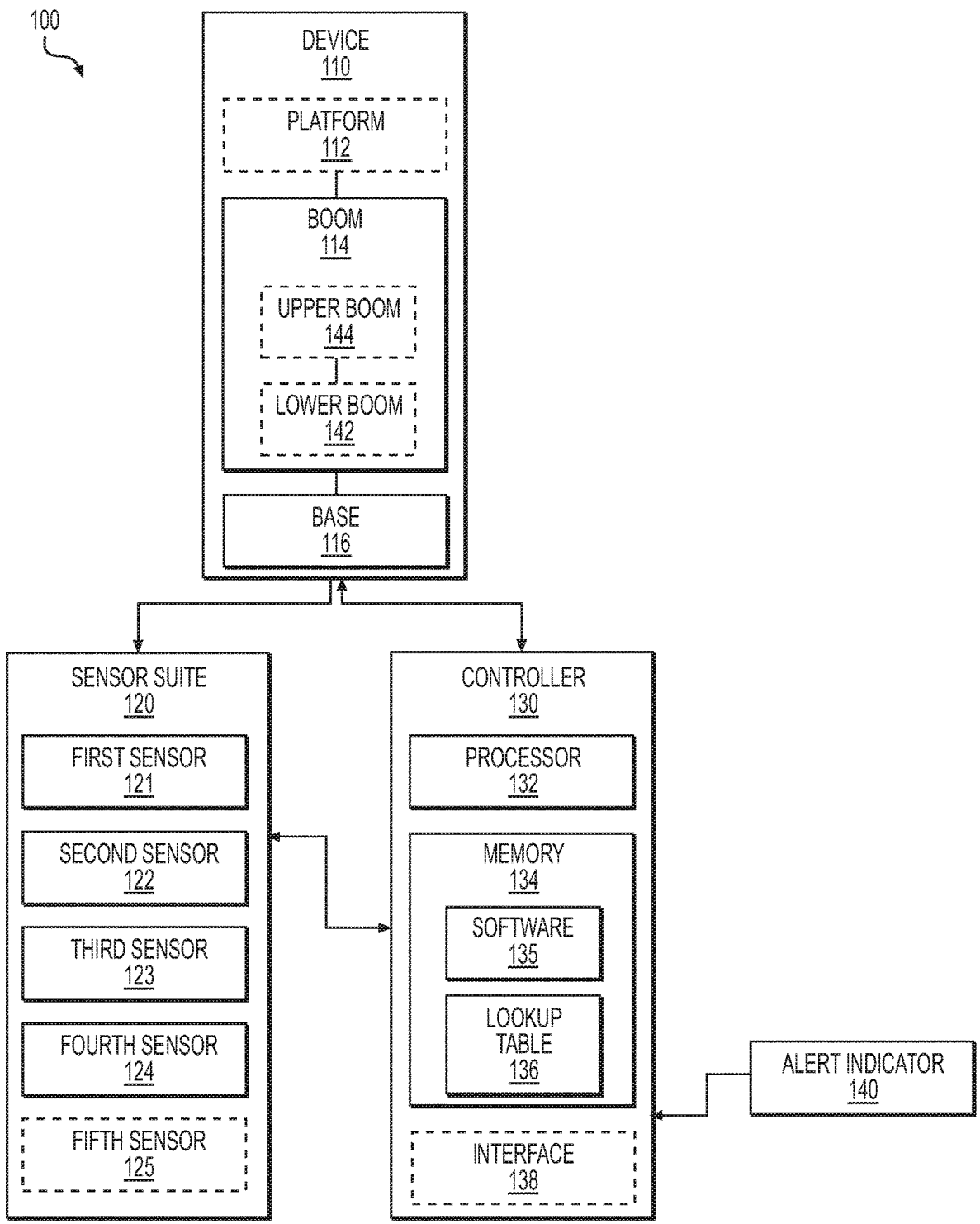
FIG. 1 is a block diagram illustrating a dual boom monitoring system, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

FIG. 1 shows a block diagram of an exemplary boom load monitoring system 100. The boom load monitoring system 100 includes a device 110, a sensor suite 120 having a plurality of sensors, a controller 130, and an alert indicator 140. In certain embodiments, the device 110 is an aerial device used to access elevated objects or otherwise difficult to reach items. The device 110 includes a boom 114 that may be used to lift and move or suspend an object, such that the weight of the object applies a load to the boom 114.

Figure 2:
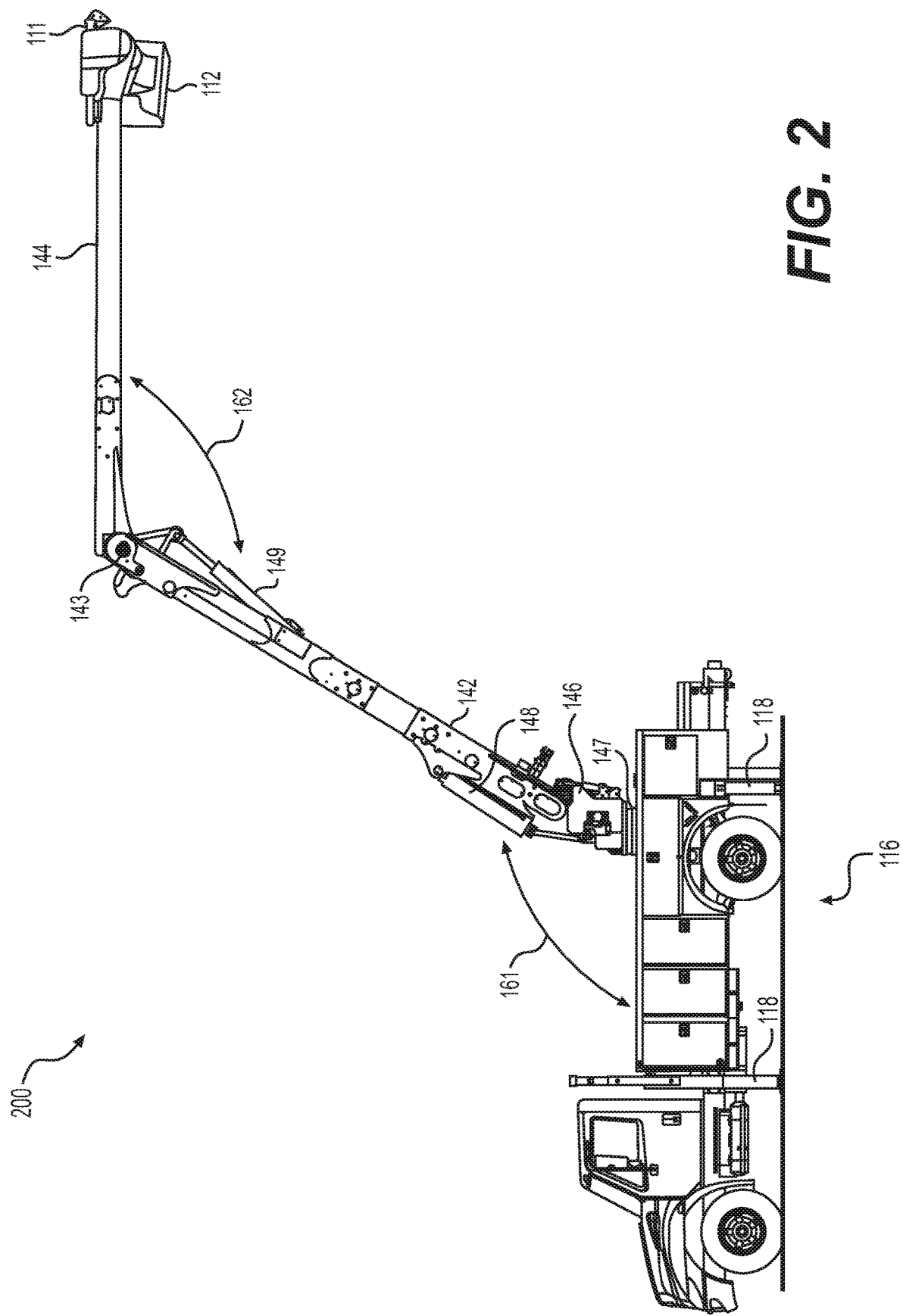
FIG. 2 shows a side view of an aerial device for use with the dual boom monitoring system of FIG. 1, in an embodiment.
Figure 3:
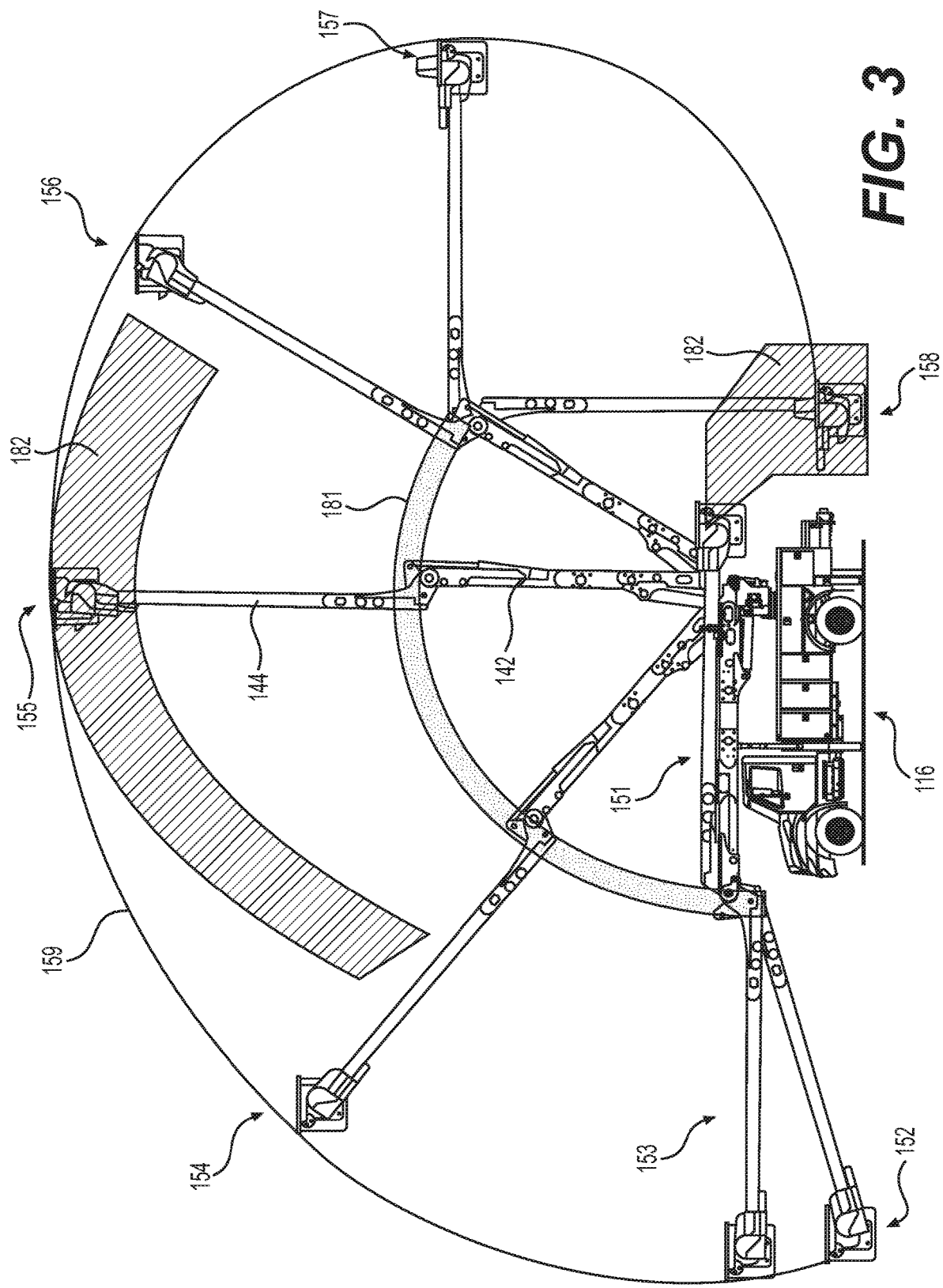
FIG. 3 illustrates five exemplary boom positions of an aerial device and cones of uncertainty for operating positions of the boom without the use of the dual boom monitoring system of FIG. 1.
Figure 4:
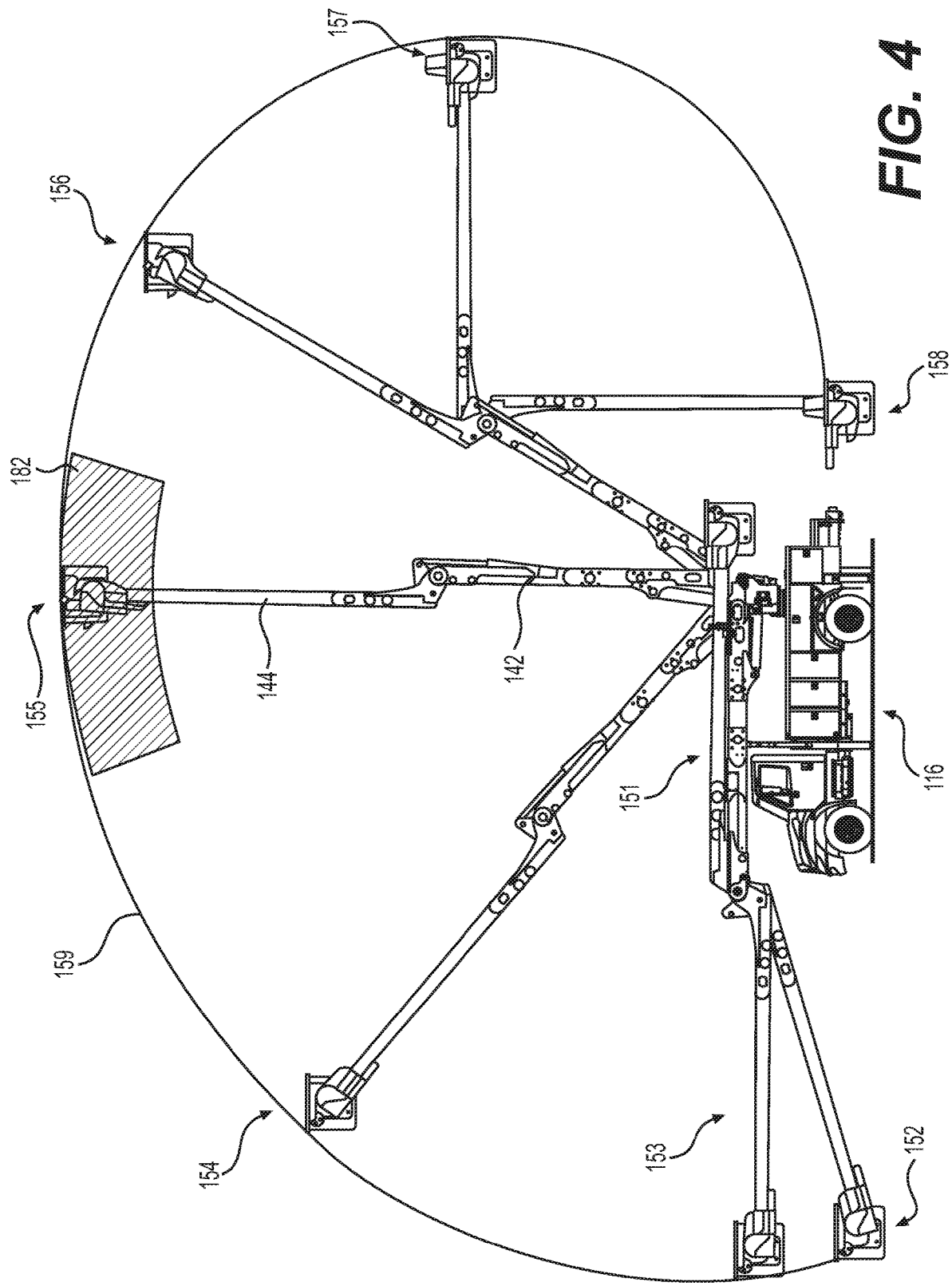
FIG. 4 illustrates five exemplary boom positions of an aerial device and cones of uncertainty for operating positions of the boom that have been effectively reduced by using the dual boom monitoring system of FIG. 1.

Boom 114 is rotatable and extendable. For extending its reach, the boom 114 may be a multi-segment boom having more than one segment. For example, as depicted in FIGS. 2-4, the boom 114 may include at least a first boom segment 142 and a second boom segment 144. The boom segments may be mechanically coupled in a variety of ways to enable various movements including but not limited to extending, contracting, raising, lowering, and rotating. For example, some boom segments may be pivotally coupled with joints for articulating, while other boom segments may be telescoping for extending/contracting. However, as mentioned, the boom 114 may include greater than two segments without departing from the scope hereof. Movement of the boom 114 may be by one or more hydraulic cylinders mechanically coupled to segments of the boom 114, among other mechanical devices (e.g., cables).

A base 116 is provided to mechanically support the boom 114. The base may be stationary (e.g., a fixed structure such as a crane or an oilrig) or mobile (e.g., an earth-working machine or a utility truck). See e.g., FIGS. 2 through 4. In certain embodiments, the first boom segment 142 is arranged as a lower boom 142 mechanically coupled to the base 116, and the second boom segment 144 is arranged as an upper boom 144 mechanically coupled to the lower boom via a joint or elbow 143 (see e.g., FIGS. 1-4).

An optional platform 112 may be mechanically coupled to a tip of the boom 114 at its distal end. The base 116 is mechanically coupled to a first end of the boom 114 (e.g., the proximal end), and the optional platform 112 is mechanically coupled to a second end of the boom 114 (e.g., the distal end), opposite the first end. The platform 112 may be used to attach one or more objects, and the platform 112 may also be configured to support one or more operators (e.g., in a utility bucket).

The weights of any onboard operators and attached objects collectively apply a load to the boom 114. The amount of weight that can be lifted depends on the boom's orientation. In other words, a maximum load limit of the boom varies as the load is moved by the boom. Therefore, it's important to have a monitoring system that operates automatically and in real-time or near real-time, and it's important to be able to monitor the load limit for all possible positions of the boom.

An excessive load applied to the boom 114 (in magnitude and/or duration) may cause damage to the device 110, its components, and/or the load. Furthermore, an excessive load may risk harming an operator of the device 110, especially if the operator is onboard the platform 112 (e.g., in a utility bucket). In certain positions, boom linkages cause inefficient lifting, requiring an upsized hydraulic cylinder. As a result, hydraulic cylinder capacity is typically higher than the structural limits of the boom 114 for certain boom positions. Consequently, if the operator does not follow the capacity charts, the operator may lift a load beyond the structural capacity of the machine.

Traditional means of determining unsafe situations include displaying lifting capacity charts on an aerial device for assisting an operator in determining unsafe situations. In practice, however, the complexity of aerial device loading, due in part to positioning of the load (see e.g., load path 159 in FIGS. 3 and 4), Additionally, loads of unknown weight may be lifted with the aerial device, requiring by the operator to determine safe situations. For example, during phase lifting, in which the boom 114 is used to lift a power line, a large and unknown load may be placed on the boom 114. Embodiments of the present disclosure provide systems and methods for monitoring information about the device 110, determining when the device 110 is approaching an unsafe situation in real-time, and alerting an operator of the device 110 so that the operator may take appropriate corrective action to avoid an overload of the device 110.

A previous boom load monitoring system and method is described in U.S. Pat. No. 10,427,926 to Mourlam, which includes at least one sensor for providing information to a controller about a real-time load level associated with an aerial device having an extendable boom. The controller determines if a load limit has been reached and initiates an alert to a user of the aerial device that a load limit has been reached to avoid unsafe situations. However, when the previous boom load monitoring system is used with an overcenter stacked aerial unit, the boom may be placed in certain working positions within its operating range in which the monitoring system has a reduced ability to determine the load applied to the boom. These working positions may be referred to as "cones of uncertainty" which are three-dimensional spaces in which uncertainty exists when determining the load applied to the boom. The uncertainty may be caused by certain boom positions in which hydraulic fluid pressure in one or more hydraulic cylinders remains unchanged despite a change in an applied load to the boom.

An object of the presently disclosed dual boom monitoring system and method is to reduce the cones of uncertainty to as to accurately determine the load at a greater number of boom positions.

Returning to FIG. 1, the sensor suite 120 sends one or more signals indicative of active information about the device 110 to the controller 130. The controller 130 determines an effective load on the device 110 based at least in part on the information received from the sensor suite 120. The controller 130 also determines a load limit based on a position of the boom 114. The controller 130 then determines whether to alert the operator of a potentially unsafe situation. This is similar to the previous boom load monitoring method (described in U.S. Pat. No. 10,427,926 to Mourlam). In the dual boom load monitoring method disclosed herein, additional sensors are used to provide additional information to the controller 130 for providing improved monitoring that greatly reduces the cones of uncertainty, thereby providing a safer monitoring method. The dual boom monitoring method also uses the additional sensor information to improve corrections for friction that are applied to hydraulic fluid pressure values when determining effective loads on the boom. This improves load monitoring accuracy and also contributes to reducing the cones of uncertainty. The steps of an exemplary dual boom load monitoring method 500 are described below in connection with FIG. 5.

The sensor suite 120 includes a plurality of sensors for monitoring aspects of the device 110, including determining a hydraulic fluid pressure of a hydraulic cylinder mechanically coupled to the boom 114 for raising and lowering the boom 114, and determining an angle of an orientation of at least a portion of the boom 114.

A first sensor 121 monitors position of the first boom segment 142 (e.g., the lower boom 142). The lower boom 142 may be pivoted upwardly with respect to a turntable 146 (see e.g., FIGS. 3 and 4) via a first boom hydraulic cylinder 148, which is a mechanical actuator having pressurized hydraulic fluid. (In certain embodiments, the first boom hydraulic cylinder 148 may be referred to as the lower boom hydraulic cylinder 148). The first sensor 121 is, for example, an angle sensor located on the lower boom 142 and configured to measure a first boom joint angle 161. In embodiments with the first boom segment 142 in the lower configuration, the angle between the lower boom 142 and the base 116 may be referred to as the lower boom joint angle 161 (see FIG. 2). For the embodiment depicted in FIG. 2, the lower boom joint angle 161 is defined herein as the angle between the lower boom 142 and the base 116 in the forward direction of the utility truck. An exemplary lower boom angle sensor includes, but is not limited to, an inclinometer. Alternatively, a rotary encoder or a rotary variable differential transformer (RVDT) may be used to monitor rotation of the lower boom 142 about its pivot axis for determining the first boom joint angle 161. Another option is to use a linear position sensor to monitor extension of the first boom hydraulic cylinder 148 and determine the angle of the lower boom 142 based on the extension of the hydraulic cylinder 148 in combination with known geometry parameters of the hydraulic cylinder 148 and the lower boom 142. An exemplary linear position sensor includes, but is not limited to, a linear encoder or a linear variable differential transformer (LVDT).

A second sensor 122 monitors position of the second boom segment 144 (e.g., the upper boom 144). In certain embodiments, the second sensor 122 provides information for determining a second boom joint angle 162 (see FIG. 2), which is the angle between the second boom 144 and the first boom 142. The second sensor 122 may be configured to monitor an extension position of a second boom hydraulic cylinder 149 and provide the extension position information to the controller 130. (In certain embodiments, the second boom hydraulic cylinder 149 may be referred to as the upper boom hydraulic cylinder 149). The second boom hydraulic cylinder 149 is a mechanical actuator using pressurized hydraulic fluid that extends to raise the upper boom 144, and retracts to lower the upper boom 144, with respect to the lower boom 142 (see FIGS. 2 through 4). In other words, the second boom hydraulic cylinder 149 is configured to pivotally raise and lower the upper boom 144 with respect to the lower boom 142. An exemplary sensor used for the second sensor 122 is a linear position sensor (e.g., a linear encoder or a LVDT) to monitor the extension position of the second boom hydraulic cylinder 149. Alternatively, the second sensor 122 may be a completely different type of sensor, such as an inclinometer adapted to measure the upper boom angle with respect to the lower boom 142, or a rotary encoder or a RVDT configured to measure rotation information about an elbow 143 (see FIG. 2) connecting the lower boom 142 with the upper boom 144. Based on the information of the second sensor 122, in combination with known geometries of the boom 114 (e.g., the first boom joint angle 161), controller 130 determines the second boom joint angle 162.

A third sensor 123 monitors hydraulic fluid pressure of the first boom hydraulic cylinder 148 and provides corresponding pressure information to the controller 130. The third sensor 123 is for example a pressure transducer that measures hydraulic fluid pressure on a bore side of the hydraulic cylinder. In some embodiments, the third sensor 123 includes a pair of pressure transducers, including a first pressure transducer on the bore side of the hydraulic cylinder and a second pressure transducer on a rod side of the hydraulic cylinder, and pressure values from both the first and second pressure transducers are provided to the controller 130 to determine the hydraulic fluid pressure. An effective load pressure on the first boom hydraulic cylinder 148 may be determined based on a difference of a bore-side pressure and a rod-side pressure with respect to a ratio of the cross-sectional areas of the bore side and rod side: $P_{Effective\ load} = P_{bore} - P_{rod}(A_{bore}/A_{rod})$.

A fourth sensor 124 monitors hydraulic fluid pressure of the second boom hydraulic cylinder 149 and provides corresponding pressure information to the controller 130. The fourth sensor 124 is an example of the third sensor 123 described above (e.g., it may include a pair of pressure transducers for measuring the bore side and the rod side of the hydraulic cylinder).

In certain embodiments, a fifth sensor 125 is an angle sensor for determining an angle of the base 116 with respect to a substantially horizontal orientation. For example, if base 116 is a utility truck, fifth sensor 125 is a chassis angle sensor used to determine an angle between the ground and the truck chassis. In situations where the truck is not level (e.g., parked on an incline), determining the chassis angle is important for determining the lower boom joint angle 161, which is important for reducing cones of uncertainty.

The information from the sensor suite 120 may be provided continuously (e.g., via an analog signal) or at regular intervals (e.g., a digital signal at a processor rate). Alternatively, the controller 130 may send a request for information from the sensor suite 120 at any instance or according to any schedule. Communication between the controller 130, the device 110, and the sensor suite 120 may be via a wired and/or wireless communication media. For example, the controller 130 may include a transceiver (e.g., a transmitter/receiver), a multi-channel input/output (I/O) data bus, or the like (not shown) for communicatively coupling with the plurality of sensors (e.g., sensors 121-125). Similarly, individual sensors of the sensor suite 120 may include a wireless transceiver, or the individual sensors may be wired to a multi-channel I/O data bus, or the like (not shown) for communicatively coupling the plurality of sensors with the controller 130.

In various embodiments, the controller 130 samples, receives, or otherwise acquires position/angle and pressure information from the sensor suite 120 occasionally, periodically, continuously, or substantially continuously. Additionally, or alternatively, the controller 130 may be sampling, receiving, or otherwise acquiring the position/angle and pressure indications only upon the presence of certain conditions. For example, the system 100 may have an idle mode in which the controller 130 is idle.

Signals from at least one sensor of the sensor suite 120 may be filtered to remove signal noise. For example, the signals may include oscillations or other signal spikes that could produce false-positive alerts. In an embodiment, a low-pass filter is tuned to oscillations of the boom 114 for filtering the signals. Alternatively, an exponential filter, a moving-average filter, or a finite impulse response (FIR) filter may be used.

Based on information from the plurality of sensors of the sensor suite 120 and the lookup tables 136, the controller 130 may determine an effective load on the device 110. The lookup tables 136 provide predetermined information about the system 100 in the form of at least one set or matrix of data, as further described below.

The controller 130 is for example a computer, microcontroller, microprocessor, or programmable logic controller (PLC) having a memory 134, including a non-transitory medium for storing software 135, and a processor 132 for executing instructions of the software 135. An example of software instructions includes steps of the method 500, described below in connection with FIG. 5. The controller 130 is not limited by the materials from which it is formed or the processing mechanisms employed therein and, as such, may be implemented via semiconductor(s) and/or transistors (e.g., electronic integrated circuits (ICs)), and so forth. It should also be appreciated that the discussed functions and methods performed by the controller 130 may be performed by other processors.

The controller 130 may further include an optional interface 138 for the user to transmit instructions and receive information. In an embodiment, the optional interface 138 includes a reset switch that enables an operator to clear an overload indication for resetting the system 100 (e.g., following an inspection of the system 100). In some embodiments, the interface 138 includes a hand-held control stick (e.g., a joystick or sidestick controller) and/or one or more buttons for moving boom 114 to position components of the device 110 (e.g., the platform 112). In other embodiments, the interface 138 includes a computer, a touch screen, or a mobile device.

The alert indicator 140 may provide an alert that informs an operator of the device 110 of a potential unsafe situation, such as an expected overload, as described below in connection with the method 500, FIG. 5. The alert indicator 140 may include an alerting mechanism to produce the alert such as a display device, a speaker system, a headphone worn by the operator, a buzzer, light sources (e.g., multi-colored lights), or other similar alerting mechanisms.

FIG. 2 shows a side view of an aerial device 200, which is an example of the device 110, FIG. 1. Similar components illustrated in different figures are enumerated with like numerals and may include alternative embodiments.

The aerial device 200 includes some sort of base that supports an extendable member configured for reaching. In the embodiment depicted in FIG. 2, the base 116 is a utility truck. The boom 114 provides an extendable member for moving the platform 112. The base 116 provides a stable support, which may include outriggers 118, for supporting a load applied to the boom 114 and/or the platform 112. In an embodiment, the platform 112 includes a jib 111 configured for securing objects thereto. The platform 112 may rotate to alter its orientation with respect to the boom 114. The boom 114 may fold into a collapsed position (see e.g., FIG. 4), which enables transporting via a mobile version of the base 116.

The boom 114 is mechanically coupled to, and configured to support, the platform 112. The optional platform 112 is located at the distal end (with respect to the mobile base 116) of the upper boom 144. The upper boom 144 may include an optional telescoping arm (not shown) that extends from, and retracts within, the upper boom 144. The lower boom 142 may be mechanically coupled to a turntable 146 configured for rotating the boom 114. A pedestal 147 may be included to support the turntable 146 and is mechanically coupled to the base 116.

In operation, the platform 112 is raised by a combination of the lower boom 142 pivoting upwards, the upper boom 144 pivoting about elbow 143, and the telescoping arm optionally extending out of the upper boom 144.

In an embodiment, the platform 112 is configured for securing a load thereto (e.g., via the jib 111). The load may be any object having weight that is suspended from or otherwise applied to a component of the boom 114. Prior to extending the boom 114, the base 116 may be moved to an appropriate location and stabilized. The boom 114 may be rotated about the turntable 146, and extended upwards and outwards away from the base 116 by pivoting the lower boom 142, the upper boom 144, and by extending the telescoping arm. Various combinations of these movements may be employed to position the platform 112 (see e.g., FIGS. 3 and 4). Operation of the platform 112 may be by remote control for operator convenience or safety.

In certain embodiments, the upper boom 144 and any telescoping arm that may extend from the upper boom are electrically insulating (e.g., fiberglass) to enable safe operation near electrical power lines. However, the failure mode for a fiberglass arm is different than that of steel and exhibits less evidence of an impending failure. Accordingly, monitoring the load placed on an insulating segment may be particularly important to prevent structural failure.

FIGS. 3 and 4 show a side view of an aerial device 300, which is an example of aerial device 200 of FIG. 2. FIGS. 3 and 4 illustrate eight exemplary boom positions: a first position 151, a second position 152, a third position 153, a fourth position 154, a fifth position 155, a sixth position 156, a seventh position 157, and an eighth position 158. The first position 151 provides a folded or collapsed configuration enabling the aerial device 200 to be transported via a mobile version of the base 116. The second position 152 is characterized by the lower boom 142 remaining folded while the upper boom 144 is extended downwardly in front of the base 116 enabling the platform 112 to touch the ground. The third position 153 is characterized by the lower boom 142 remaining folded while the upper boom 144 is extended substantially horizontally in front of the base 116. The fourth position 154 is characterized by the lower boom 142 being partially raised upwardly and the upper boom 144 extending substantially straight from the lower boom 142 in front of the base 116. The fifth position 155 provides a substantially upright orientation of the boom in which both the lower boom 142 and the upper boom 144 are substantially vertically oriented. The sixth position 156 is similar to the fourth position 154 with the lower and upper and booms 142, 144 partially raised and straight with respect to one another, albeit at a different angle and orientation (e.g., extending behind the base 116). In the seventh position, the lower boom 142 is partially raised as in the sixth position 156; however, the upper boom 144 is bent with respect to the lower boom 142 such that the upper boom 144 is substantially horizontally extended behind the base 116. In the eighth position 158, the lower boom 142 is partially raised as in the sixth position 156; however, the upper boom 144 is further bent towards the lower boom 142 such that the upper boom 144 is substantially vertically oriented downwardly, enabling the platform 112 to touch the ground behind the base 116.

In operation, the boom 114 is raising anytime the lower boom 142 is pivoting upwardly from the base 116 such that the lower boom joint angle 161 (as depicted in FIG. 2) is shrinking. Conversely, the boom 114 is lowering anytime the lower boom 142 is pivoting downwardly towards the base 116 such that the lower boom joint angle 161 (as depicted in FIG. 2) is growing. In FIGS. 3 and 4, raising of the boom occurs while the boom 114 is moving from the third position 153 to the fourth position 154 and on to the fifth position 155, for example. Lowering of the boom 114 occurs while the boom is moving from the fifth position 155 to the sixth position 156, for example.

The boom 114 is unfolding anytime the upper boom 144 is pivoting away from the lower boom 142 such that the upper boom joint angle 162 is growing. Conversely, the boom 114 is folding anytime the upper boom 144 is pivoting towards the lower boom 142 such that the upper boom joint angle 162 is shrinking. In FIGS. 3 and 4, unfolding occurs while the boom 114 is transitioning from the first position 151 to the second position 152 or the third position 153, for example. Folding occurs while the boom 114 is transitioning from the sixth position 156 to the seventh position 157 and on to the eighth position 158, for example.

A path 159 illustrates an exemplary trajectory that the platform 112 may take while moving between the positions 152 through 158. However, the positions 152 through 158 are exemplary only and a myriad of additional positions and paths may also be obtained by rotating, pivoting, and extending boom segments.

In operation, a load is applied to the platform 112, and the load is moved along a path (e.g., a portion of the path 159 in FIGS. 3 and 4). An effective load applied to the boom 114 is a function of the orientations and extensions the boom 114 components. For example, lifting a load from the ground to an elevated position may involve four lifting steps. In a first step, the boom 114 is oriented in the second position 152 enabling a load on the ground to be attached to the platform 112 (e.g., via the jib and/or cables, hooks, straps, etc.). In a second step, the load is raised from the second position 152 to the third position 153, which is characterized by unfolding the upper boom 144. In a third step, the load is raised from the third position 153 to the fourth position 154, which is characterized by raising of the lower boom 142. In a fourth step, the load is further raised from the fourth position 154 to the fifth position 155 in which the boom 114 reaches an apex of the path 159. The lifting steps are described separately for clarity of illustration in connection with FIGS. 3 and 4; however, the lifting of a load does not necessarily include a pause between steps, but instead the lifting steps may seamlessly transition from one step to the next.

The orientation of the boom 114 affects how a load applied to the distal end of the boom (e.g., at the platform 112) produces torque on the components of the boom 114. For example, when the boom 114 is oriented such that the load is not directly above the turntable 146, the load applies a torque via the boom 114 that could damage the boom 114 or turntable 146, or overturn the base 116. Method 500 monitors various aspects of the boom 114, determines safe operating positions for the platform 112, and alerts an operator in real-time if a potential unsafe situation is approached. Additionally, the method 500 uses information from sensor suite 120 in various ways depending on the motion state and position of the boom 114 in order to minimize cones of uncertainty.

The cones of uncertainty are working positions of the boom 114 in which a reduced ability exists to detect changes in the load applied to the boom. The cones of uncertainty exist because at certain boom positions, described below, a change in a load applied to the boom does not produce a corresponding change in hydraulic fluid pressure in either the first boom hydraulic cylinder 148, the second boom hydraulic cylinder 149, or both.

The two most common sources of uncertainty are caused by 1) cylinder dead-head and 2) the near vertical position. Cylinder dead-head occurs at the start or end of the hydraulic cylinder stroke in which changes to the load do not coincide with proportional changes in the hydraulic cylinder pressure. An exemplary cone of uncertainty due to cylinder dead head is shown as region 181 in FIG. 3. When the boom 114 crosses through the near vertical position, the load applied to the tip of the boom is substantially supported by the structural components of the boom 114 without requiring full pressure in the hydraulic cylinders such that the pressure in the cylinders goes to zero (or close to zero) despite an applied load. The "near vertical" zones of uncertainty are shown as regions 182 in FIGS. 3 and 4. The near vertical zones of uncertainty occur when the upper boom is substantially vertically oriented or nearly vertically oriented. FIG. 3 shows the cones of uncertainty when using a single boom monitoring method, whereas FIG. 4 shows reduced cones of uncertainty when using the presently disclosed dual boom monitoring method 500. Note that regions 182 are substantially reduced and region 181 is substantially eliminated by using method 500 (see FIG. 3 versus FIG. 4, and Table 1).

In operation, the dual boom monitoring method 500, described below in connection with FIGS. 5 and 6, may preferentially uses hydraulic cylinder pressure values from the second boom cylinder 149 to determine load percentages for certain boom configurations. For example, in embodiments where the first boom cylinder 148 is arranged in the "lower" configuration and the second boom cylinder 149 is arranged in the "upper" configuration (as depicted in FIGS. 2-4), the lower boom lift cylinder 148 may be larger than the upper boom lift cylinder 149 since it has to lift both the upper boom 144 and the lower boom 142. Consequently, the lower boom lift cylinder 148 has less sensitivity compared with the upper boom lift cylinder 149. Therefore, for certain boom configurations, using the upper boom cylinder pressure tends to provide better resolution and accuracy for determining the load percentages, except when the upper boom 144 is operating in a cone of uncertainty. When the upper boom 144 is in a cone of uncertainty, the method 500 switches to using pressure from the lower boom hydraulic cylinder 148 to determine load percentages. In certain embodiments, the method 500 provides early detection of when the upper boom 144 is approaching a cone of uncertainty for transitioning from the upper boom load percentage to the lower boom load percentage, as further described below.

In some embodiments, the load percentages are based on "no-load" hydraulic pressure values (i.e., pressure values for a hydraulic cylinder of the lower boom 142 or the upper boom 144 without an external load applied to the boom 114). Matrices of no-load hydraulic pressure values may be determined for the lower boom hydraulic cylinder 148 and the upper boom hydraulic cylinder 149 over a range of lower boom joint angles 161 and upper boom joint angles 162. The matrices of no-load hydraulic pressure values are stored in the lookup tables 136. The no-load hydraulic pressure values may be used to normalize hydraulic pressure values with a load. For example, the no-load hydraulic pressure values may be subtracted from the measured hydraulic pressure values (with a load) and the load limits prior to calculating load percentages.

In certain embodiments, load percentages are calculated instead of using load pressure values because of the differences in absolute pressure between the upper boom hydraulic cylinder 149 and the lower boom hydraulic cylinder 148. The boom load percentage is calculated using Equation 1 as a ratio of the measured load pressure (minus a no-load pressure) to the load pressure limit (minus the no-load pressure) for the upper boom (UB).

$$\text{Boom Load \%} = \frac{\text{Load Pressure}_{UB,Measured} - \text{Load Pressure}_{UB,No\,Load}}{\text{Load Pressure}_{UB,Limit} - \text{Load Pressure}_{UB,No\,Load}} \times 100\% \quad \text{Equation 1}$$

The lower boom load percentage is calculated in the same manner, and in fact, the lower boom load percentage is typically equal to the upper boom load percentage after normalizing the load pressure values by subtracting the no-load pressures.

When the difference between the load pressure limit and the no-load load pressure falls below a predetermined value, the controller 130 determines that the boom is crossing into a near vertical cone of uncertainty. From Equation 1, as the difference between the capacity and no-load pressure approaches zero, the boom load percentage approaches infinity. To avoid this scenario, the method 500 switches from using the upper boom hydraulic cylinder pressure to the lower boom hydraulic cylinder pressure. To avoid an abrupt transition, the switch may be made gradually using a blending algorithm (e.g., a proportional linear transition between upper and lower hydraulic cylinder pressures). To anticipate approaching the near vertical cone of uncertainty 182, the upper boom joint angle 162 may be monitored by the controller 130 to determine a distance from the near vertical cone of uncertainty 182 (see Step 530, FIG. 5). When the upper boom 144 moves out of a near vertical cone of uncertainty, the method 500 switches back to using the upper boom hydraulic cylinder pressure to determine the load percentage via Equation 1.

When the upper boom joint angle 162 approaches a predetermined limit near the end of stroke for the upper boom hydraulic cylinder 149, the load percentage is determined by transitioning from using the pressure of the upper boom hydraulic cylinder 149 to that of the lower boom hydraulic cylinder 148.

In certain scenarios, the upper boom and the lower boom may both be in cones of uncertainty, referred to as a "double cone". In some embodiments, measurements from other parts of the device 110 may be used to estimate load changes in a double cone of uncertainty. For example, a platform load or a jib load may be used to modify a difference in the boom load measurement as a function of how the jib load or the platform load changes, rather than using the boom load measurements themselves.

In some embodiments, the distance from the cone of uncertainty is determined (see Step 530, FIG. 5) and compared to a table (e.g., stored in lookup tables 136) to determine how far away the boom 144 is from the nearest cone of uncertainty. When the distance from the cone of uncertainty is greater than a predetermined distance, the controller 130 may ignore the blend algorithm and instead rely solely on the upper boom hydraulic cylinder pressure to determine load percentage. In some embodiments, a ratio of the blend is proportional to a distance of the boom from the cone of uncertainty.

In certain boom orientations, the upper boom load percentage does not match the lower boom load percentage, complicating the ability to switch from one to the other. For example, when the lower boom 142 is articulated and the upper boom 144 remains stationary with respect to the lower boom 142, the load pressure of the upper boom hydraulic cylinder 149 may change while the upper boom joint angle 162 is static. In this scenario, understanding the motion state of the boom is important for accurately determining friction for correcting the load percentage. The motion state of the boom can be characterized by two types of movement: 1) raising/lowering, and 2) folding/unfolding. Raising/lowering refers to whether the lower boom 142 is raising or lowering (i.e., whether the lower boom joint angle 161 is growing or shrinking). Folding/unfolding refers to whether the upper boom 144 is pivoting towards or away from the lower boom 142 (i.e., whether the upper boom angle 162 is shrinking or growing). Alternatively, when the boom is not moving, the state of motion may be categorized as "static". As further described below in connection with FIG. 6, the state of motion may be used for deciding which friction model to use for determining the correction for friction.

It should be appreciated that, while the above disclosure has been generally directed to the field of aerial devices, embodiments of this disclosure may be directed to other fields and uses. For example, embodiments of the boom load monitoring system may be used with a grappler attached to the end of the boom 114 (e.g., instead of the platform 112) and the load includes any object grasped by the grappler (e.g., a tree limb or telephone pole).

Figure 5:
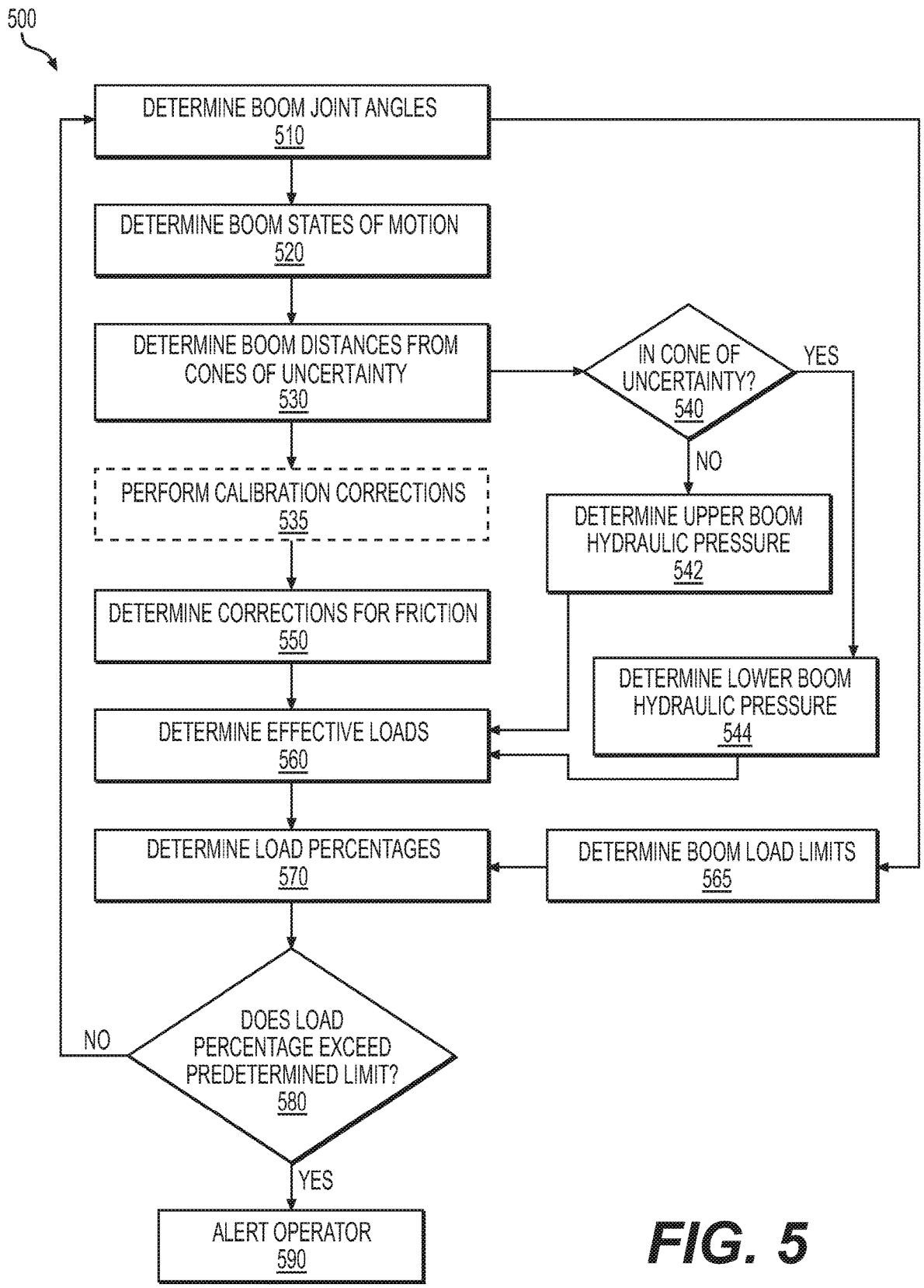
FIG. 5 shows steps of a dual boom monitoring method, in an embodiment.

FIG. 5 shows steps of an exemplary dual boom monitoring method 500. The method 500 may be performed using system 100 of FIG. 1, for example. Broadly, the method 500 determines a safe operating region in real-time for the boom 114. An effective load on the boom 114 is determined based on information received from the sensor suite 120 and predetermined information stored in the lookup tables 136. As the boom 114 approaches a boundary or limit of the safe operating region, the alert indicator 140 provides an alert to the operator in real-time so that the operator is able to avoid positioning the boom 114 beyond the safe operating region and therefore avoid overloading the boom 114. More specifically, the method 500 determines when the boom 114 is approaching a cone of uncertainty and determines the load percentage accordingly. In the steps described below, the controller 130, FIG. 1 performs the various steps, but it should be appreciated that this is only an exemplary embodiment. Other electronic components or a combination thereof may perform any or all of the discussed steps.

In a Step 510, boom joint angles are determined. In an example of step 510, the controller 130 determines the first boom joint angle 161 based on information received from the first sensor 121 and the fifth sensor 125. For example, the lower boom joint angle 161 is based on the angle of the lower boom from first sensor 121, and for situations where the base 116 may be unlevel, the angle of the base 116 from the fifth sensor 125. In another example of Step 510, controller 130 determines the second boom joint angle 162 based on information received from second sensor 122. The signals from the first, second, and fifth sensors 121, 122, 125 may be filtered using a time constant based on typical state of motion transitions. For example, the signals may be filtered by a latching discrete filter triggered by observing consecutive motion trends. The controller 130 may acquire the information actively (e.g., the controller 130 transmits a request to the first sensor 121 to retrieve the information) or the controller 130 may passively receive the information (e.g., the first sensor 121 automatically transmits the information). It should be appreciated that the controller 130 may be acquiring information from numerous different sensors simultaneously or in rapid succession.

In a Step 520, a state of motion of the boom is determined. In an example of Step 520, a motion observer monitors the first boom joint angle 161 and the second boom joint angle 162 over time. The motion observer includes an algorithm stored in software 135 that determines a state of motion of the lower boom 142 and the upper boom 144 for a predetermined duration based on the lower and upper boom joint angles 161, 162 determined in Step 510, respectively. The predetermined duration may be long enough to ignore signal spikes from the sensors 121, 122 and short enough to properly observe normal use of the boom 114 by the operator. The motion observer sets the state of motion of the lower boom 142 to either "lowering", "raising", or "static" based on the angle 161 over the predetermined duration. Similarly, the motion observer sets the state of motion of the upper boom 144 to either "unfolding" if the upper boom joint angle 162 is increasing, "folding" if the angle 162 is decreasing, and "static" if the angle 162 stays substantially the same over the predetermined duration.

The state of motion of the boom 114 determined in Step 520 is used in subsequent steps (e.g., determining boom distances from a cone of uncertainty in Step 530 and determining corrections for friction in step 550) as further described below.

In a Step 530, boom distances from a cone of uncertainty are determined. In an example of Step 530, the controller 130 determines boom distances from a cone of uncertainty 181, 182 based on the lower and upper boom joint angles 161, 162. The cones of uncertainty may be defined as ranges of the lower and upper boom joint angles 161, 162 that put the distal end of the upper boom 144 within a predetermined position. In certain embodiments, the cones of uncertainty are determined based on empirical observations from a plurality of booms 114.

In an optional step 535, calibration corrections are performed. In certain embodiments, the calibration corrections are determined for each individual boom 114 to correct for differences between the predicted and actual boom load limits.

Step 540 is a decision. If in Step 540, it is determined that the boom is positioned outside any cones of uncertainty, the method 500 proceeds with a Step 542 to determine the upper boom hydraulic fluid pressure. Alternatively, if in Step 540, it is determined that the boom 114 is positioned within any one of the cones of uncertainty, the method 500 proceeds with a Step 544 to determine the lower boom hydraulic fluid pressure. In an example of Step 540, the controller 130 determines whether or not any position/orientation of the boom 114 puts it one of the cones of uncertainty 181, 182 and proceeds with determining the effective load in a Step 560 based on hydraulic fluid pressure information from the appropriate hydraulic cylinder (either the lower boom hydraulic cylinder 148 via sensor 123 or the upper boom hydraulic cylinder 149 via sensor 124). In embodiments, the default option for determining the effective load in Step 560 is based on the upper boom hydraulic fluid pressure (in Step 542), but when the upper boom 144 is in a cone of uncertainty, the method 500 switches to using the lower boom hydraulic fluid pressure (in Step 544) to determine the effective load in Step 560. In certain embodiments, the method 500 blends the contribution of the upper and lower boom hydraulic fluid pressures as the boom is approaching a cone of uncertainty (e.g., based on the boom distance from a cone of uncertainty, as determined in Step 530).

In a step 550, corrections to the hydraulic fluid pressures for friction are determined. Friction arises within moving parts and reduces movement efficiency. For example, sliding rings and seals of a hydraulic cylinder piston create friction. Friction is unique to individual hydraulic devices due to such factors as cylinder wear, valve leakage over time, and manufacturing tolerances. Therefore, even for booms of the same design, the amount of friction experienced may differ between individual booms. Friction also varies due to changes in operating conditions (e.g., friction is temperature dependent). In addition, friction differs between folding and unfolding of the boom 114 due to hysteresis, which is generated by counterbalance valves and whether the boom 114 is moving the load with or against gravity. Therefore, corrections for friction may be empirically predetermined for accuracy, and corrections for friction may require recalibration over time or under different operating conditions. As further described below in connection with FIG. 6, corrections for friction may be based on lower boom angles, upper boom joint angles, and different states of motion of the boom 114 (e.g., folding, static, or unfolding). Correction for friction information may be stored in the software 135 (e.g., in the lookup tables 136) for retrieval upon calculating an effective load (e.g., in Step 560, described below).

At a certain upper boom joint angle, the load pressure reaches a maximum pressure, referred to hereinafter as a peak load pressure. In other words, as the upper boom joint angle is increased during unfolding from a minimum angle, the load pressure increases to the peak load pressure. The upper boom joint angle at which the peak load pressure occurs may be referred to as a peak load angle. As the boom continues unfolding to angles greater than the peak load angle, the load pressure decreases. In certain embodiments, the maximum amount of friction occurs when the upper boom joint angle is in proximity with the peak load angle. Therefore, the correction for friction may be based on a difference between the upper boom joint angle and the peak load angle (e.g., proportional to the difference).

The peak load angle and peak load pressure depend on the lower boom angle and the state of motion of the boom. For example, a higher peak load pressure and a higher peak load angle are observed at a larger lower boom angle (e.g., 105°) compared to a smaller lower boom angle (e.g., 90°). In another example, a higher peak load pressure and a higher peak load angle are observed when the boom 114 is unfolding compared to when the boom 114 is folding. The controller 130 may determine in Step 520 whether the boom 114 is folding, static, or unfolding by monitoring the upper boom joint angle over time.

Figure 6:
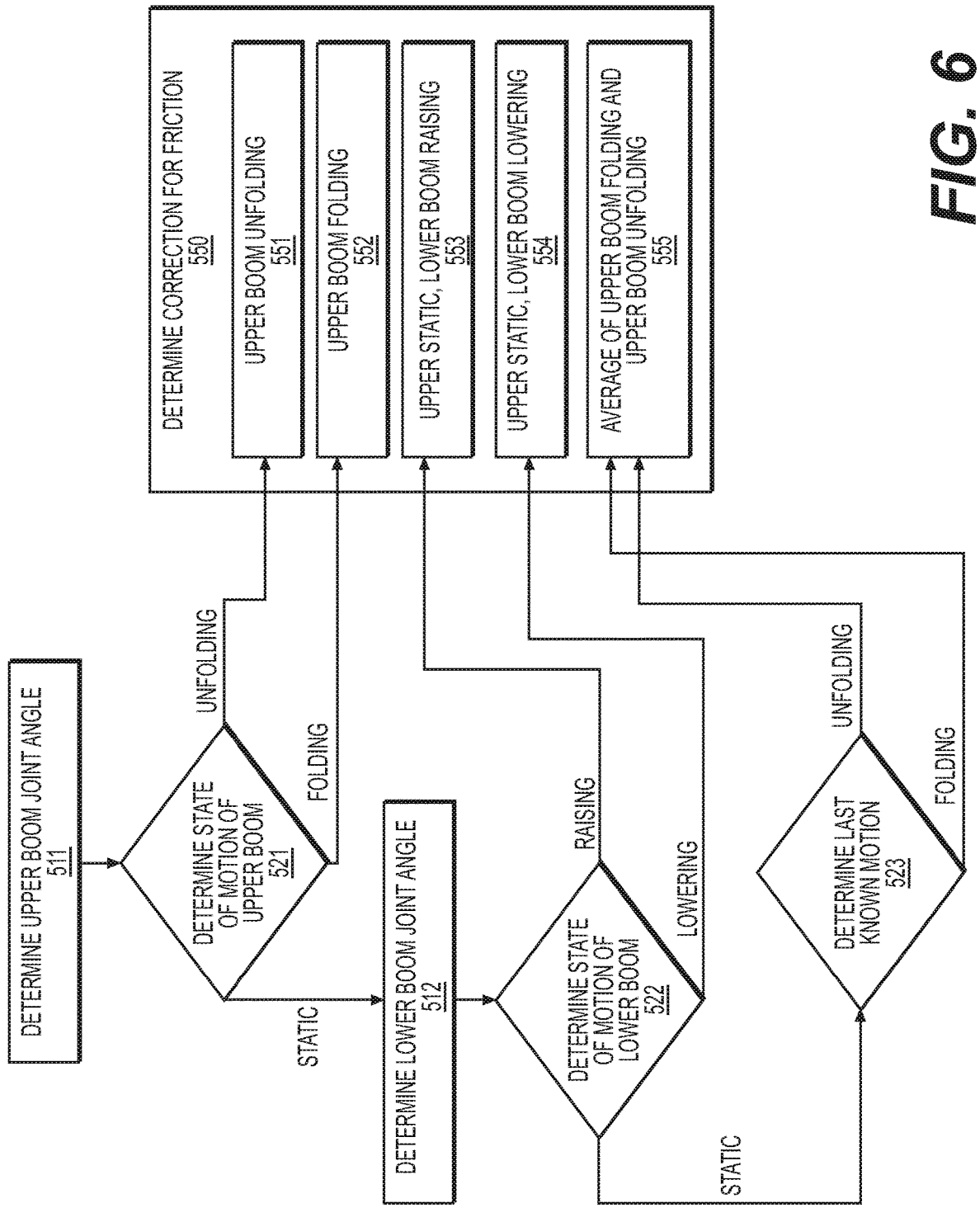
FIG. 6 shows steps for determining which friction model to use for correcting load percentage in the method of FIG. 5, in an embodiment.

FIG. 6 shows optional steps of method 500. Specifically, FIG. 6 shows sub-steps of Step 510, Step 520, and Step 550 of FIG. 5 that may be performed in some situations that require understanding the motion state of the boom for determining appropriate friction models for correcting load percentage. For example, Step 510 of FIG. 5 for determining the boom joint angles may include determining the upper boom joint angle in Step 511 and the lower boom joint angle in Step 512. Similarly, Step 520 of FIG. 5 for determining boom states of motion may include determining the upper boom state of motion in Step 521, the lower boom state of motion in Step 522, and the last known motion in Step 523. Based on the state of motion of the boom determined in Steps 521-523, an appropriate friction model (e.g., one of friction models 551-555) is used to determine a correction for friction in Step 550. The friction models may be empirically determined based on a population of similar booms, taking into account such factors as temperature and hysteresis, for example.

In an example of step 511, the controller 130 determines the lower boom joint angle 161 based on the angle of the lower boom 142 from the first sensor 121 and the angle of the base 116 from the fifth sensor 125. In an example of Step 512, the controller 130 determines the upper boom joint angle 162 based on the angle of the upper boom 144 from second sensor 122.

Step 521 is a decision based on the state of motion of the upper boom. When the motion observer sets the state of motion of the upper boom to "unfolding", an upper boom unfolding 551 friction model is used in Step 550. Conversely, when the motion observer sets the state of motion of the upper boom to "folding", an upper boom folding 552 friction model is used in Step 550. Alternatively, when the motion observer sets the state of motion of the upper boom to "static", the method 500 proceeds to Step 512 to determine the lower boom joint angle.

Step 522 is a decision based on the state of motion of the lower boom. When the motion observer sets the state of motion of the lower boom to "raising", an upper boom static and lower boom raising 553 friction model is used. Conversely, when the motion observer sets the state of motion of the lower boom to "lowering", an upper boom static and lower boom lowering 554 friction model is used. Alternatively, when the motion observer sets the state of motion of the lower boom to "static", the method 500 proceeds to Step 523 to determine the last known motion.

In a Step 523, a last known motion is determined. In the event that both the upper boom 144 and the lower boom 142 are determined to be static in Steps 521 and 522, the method 500 determines a last known motion of the boom 114. In an example of Step 523, the controller 130 uses an algorithm stored in software 135 that observes recent values stored in memory 134 for the upper boom joint angle 162 and determines what was the most recent motion of the upper boom. When the last known motion was unfolding of the upper boom 144, an average friction model 555 may be used, as depicted in FIG. 6, in which the upper boom folding 552 and the upper boom unfolding 551 friction models are averaged. However, in some embodiments, when the last known motion was unfolding of the upper boom 144 a different friction model is used (e.g., upper boom unfolding 551). When the last known motion was folding of the upper boom 144, the average friction model 555 may also be used, as depicted in FIG. 6. In certain embodiments, however, the upper boom folding 552 friction model is used when the last known motion was folding. Other friction models or combinations of friction models may be used to best determine the contribution of friction to the load percentage for agreement with empirical observations without departing from the scope hereof.

As depicted in the flow diagram of FIG. 6, the preference is to determine the correction for friction based on the upper boom state of motion. However, in situations when the upper boom is static or in a cone of uncertainty, the method 500 proceeds to Step 522 to determine the correction for friction based on the lower boom state of motion. When both of the upper and lower booms are static or are both in cones of uncertainty, the method 500 proceeds to Step 523 to determine the correction for friction based on the last known motion of the upper boom.

Returning to FIG. 5, in a Step 560, effective loads are determined. In an example of Step 560, the controller 130 applies a correction for friction (determined in step 550) to the hydraulic fluid pressure (determined in either Step 542, Step 544, or a combination of the Steps 542 and 554) to determine an effective load. The correction for friction accounts for friction among moving parts in the boom 114.

In a Step 565, the boom load limits are determined. In an example of Step 565, the controller 130 determines separate load limits for the lower boom 142 and the upper boom 144. A load limit is for example a theoretical limit that is calculated based on a load capacity of the lower boom 142 and the upper boom 144. A factor of safety may be incorporated into the load limits to ensure margins for safe operation. In certain embodiments, a set of load limit values are predetermined for a range of lower boom joint angles and a range of upper boom joint angles to provide matrices of predetermined load limit values for the lower and upper booms, respectively. The predetermined load limit values may be stored in the lookup tables 136. In an example of Step 565, the controller 130 determines the load limits in real-time by retrieving predetermined load limit values from the lookup tables 136 based on the first boom joint angle 161 and the second boom joint angle 162.

In a Step 570, the effective loads are compared to the load limits to determine load percentages. In an example of Step 570, the controller 130 determines a percentage or ratio of the effective load (determined in Step 560) to the load limit (determined in Step 565) for the lower boom 142 and the upper boom 144. The ratio of the effective load to the load limit provides a real-time fraction or percentage of the maximum load capacity for the lower and upper booms for current lower and upper boom joint angles. In an embodiment, the controller 130 determines whether the lower boom load percentage is greater than the upper boom load percentage by a predetermined difference or ratio. If this situation, the controller 130 alerts the operator that the lower boom may be in contact with, or collided with, an object or other interfering structure.

A Step 580 is a decision. In Step 580, the controller 130 determines whether the load percentages exceed predetermined limits for the lower and upper booms, or whether the load percentages differ from one another by a predetermined difference or ratio. If the limits for either the lower or upper booms is exceeded, or the lower boom load percentage exceeds that of the upper boom by a predetermined amount, then the method 500 proceeds with Step 590 to alert the operator. Otherwise, the method 500 returns to step 510 to repeat the method. In this manner, the method 500 continually monitors the load on the boom 114 while in use to ensure safe operation.

In an example of Step 580, the controller 130 compares the effective load percentages with predetermined limits for each boom segment. For example, the predetermined limit may be 100% of the load limit, or a lower percentage of the load limit, such as 90%, which provides a 10% margin for error. In certain embodiments, the controller 130 may compare each boom segment load percentage with more than one predetermined limit, such as a minimum limit, an intermediate limit, and an upper limit, to distinguish between different levels of potential hazard. For example, the minimum limit may be 70%, the intermediate limit may be 80%, and the upper limit may be 90%. However, these percentages are exemplary only and others may be used without departing from the scope hereof.

Appropriate alerts may be generated for different levels of overload risk based on the load percentages (see description of Step 590, below). Alternatively, the effective load percentages may be reported directly to an operator (e.g., via the alert indicator 140) in real-time, enabling the operator to monitor changes in the percentage (e.g., with text and/or graphs) to anticipate unsafe operating conditions. Changes in the load percentages over time may be used by the controller 130 to predict when the device 110 is approaching an unsafe situation in real-time (e.g., based on a rate of change of the percentage).

In certain embodiments, the limit may be predetermined, set, fixed, or variable. As used herein, "limit" may mean a value or set of values (e.g., a matrix of values), a ratio or percentage, a variable determined from an equation of other values, or another mathematical expression. The limit is indicative of certain conditions within the device 110. Other factors may also affect the limit, such as operating temperatures, the type of work being performed, other strains and tasks being performed by the device, and the like. For example, friction is temperature dependent. Therefore, in some embodiments, the limit may be determined, at least partially, based upon indications of various operating conditions, such as temperature. In other embodiments, the limit may be a static set of predetermined values, based upon various static and known characteristics of the operating conditions.

In a Step 590, an alert is provided to a user. In an example of Step 590, the controller 130 instructs the alert indicator 140 to provide an alert based on the load percentages and the predetermined limits for each boom segment (e.g., lower and upper). The alert may include audible alarms (e.g., buzzers), audible voices, visual alarms (e.g., lights), visible text, graphs, or the like (or some combination thereof). In some embodiments, the alert is configured to communicate with a remote, external computer system or mobile device. The external computer system or mobile device may be associated with a remote location used for remote control of the device 110. For example, telematics may be used for transmitting status of an overloaded boom through a cellular network to notify a remote office or customer.

If more than one predetermined limit is used in Step 580, more than one corresponding alert may be used in Step 590. For example, the minimum limit may trigger a caution-type alert to indicate that caution should be exercised; the intermediate limit may trigger a warning-type alert to indicate that a condition may possibly be unsafe; and, the upper limit may trigger an emergency-type alert to indicate a high likelihood that the condition is unsafe. The caution, warning, and emergency alerts may be easily distinguishable from one another such that the operator may take appropriate preventative actions to prevent damage to the device 110. In other words, different alerts may be produced based on the load percentages of the boom segments. Following Step 590, the method 500 returns to step 510 to repeat the steps 510 through 580 for continuing to determine if the load percentages exceed the predetermined limit to ensure safe operation of the boom 114.

For one exemplary boom having upper and lower segments, the dual boom monitoring method 500 may be compared to a single boom load monitoring method in terms of the size of the cones of uncertainty. As listed in Table 1, the near vertical cone of uncertainty was reduced from a mobility range of 19° to 3° and the end of stroke cone of uncertainty was reduced from a mobility of 3° to 0°. The size of the near vertical cone of uncertainty versus the range of motion of the boom was reduced from 13% to 2%.

TABLE 1

| Method | Near vertical cone of uncertainty | End of stroke cone of uncertainty | Size of Cone vs. Range of Motion |
|---|---|---|---|
| Single Boom Load Monitoring | 19° | 3° | 13% |
| Dual Boom Load Monitoring | 3° | 0° | 2% |

Although embodiments of this disclosure have been described with reference to the illustrations in the attached drawing figures, it is noted that equivalents may be employed and substitutions made herein without departing from the scope hereof as recited in the claims.

Having thus described various embodiments, what is claimed as new and desired to be protected by Letters Patent includes the following:

1. A monitoring system for a boom having a first boom segment and a second boom segment, comprising:
    a first sensor that monitors a position of the first boom segment;
    a second sensor that monitors a position of the second boom segment;
    a first boom hydraulic cylinder disposed between the first boom segment and a base supporting the first boom segment, the first boom hydraulic cylinder being configured to pivotally raise and lower the first boom segment with respect to the base;
    a second boom hydraulic cylinder disposed between the first boom segment and the second boom segment, the second boom hydraulic cylinder being configured to pivotally raise and lower the second boom segment with respect to the first boom segment;
    a third pressure sensor that monitors a hydraulic fluid pressure of the first boom hydraulic cylinder;
    a fourth pressure sensor that monitors a hydraulic fluid pressure of the second boom hydraulic cylinder;
    a controller having a non-transitory memory and a processor for processing software instructions stored in the memory, the controller being communicatively coupled with the first sensor, the second sensor, the third pressure sensor, and the fourth pressure sensor wherein the controller performs the steps of:
        determining a first position of the first boom segment based on data received from the first sensor;
        determining a second position of the second boom segment based on data received from the second sensor;
        determining at least one portion of the operating range in which a load applied to the boom does not produce a substantial change in the hydraulic fluid pressure of the first boom hydraulic cylinder, the second boom hydraulic cylinder, or both;
        determining whether the first position of the first boom segment or the second position of the second boom segment is within the at least one portion of an operating range of the boom, and
        when the first boom segment is inside the at least one portion of the operating range, determining an effective load on the boom based on the fourth pressure sensor, and
        when the second boom segment is inside the at least one portion of the operating range, determining an effective load on the boom based on the third pressure sensor.

2. The monitoring system of claim 1, further comprising determining the effective load on the boom, when the first boom segment is within a predetermined distance from the at least one portion of the operating range or the second boom segment is within a predetermined distance from the at least one portion of the operating range, based on the hydraulic fluid pressure from the third pressure sensor combined with the hydraulic fluid pressure from the fourth pressure sensor.

3. The monitoring system of claim 2, wherein determining the effective load on the boom is based on a distance of the first boom segment or the second boom segment from the at least one portion of the operating range.

4. The monitoring system of claim 2, wherein the controller gradually transitions the effective load on the boom based on hydraulic fluid pressure from the third pressure sensor to hydraulic fluid pressure from the fourth pressure sensor as the boom is moved towards the at least one portion of the operating range.

5. The monitoring system of claim 1, further comprising a fifth sensor that monitors an angle of the base with respect to a substantially horizontal orientation such that the controller determines the orientation of the first boom segment based partially on the fifth sensor intended for use in situations where the base is not level.

6. The monitoring system of claim 1, wherein the first sensor monitors an angle of the first boom segment with respect to the base.

7. The monitoring system of claim 1, wherein the second sensor monitors an angle of the second boom segment with respect to the first boom segment.

8. The monitoring system of claim 1, wherein the at least one portion of the operating range comprises a substantially vertical orientation of the second boom segment or a substantially vertical orientation of the first boom segment.

9. The monitoring system of claim 1, further comprising a friction model for determining, via the controller, a correction to the hydraulic fluid pressure from the third pressure sensor or to the hydraulic fluid pressure from the fourth pressure sensor.

10. The monitoring system of claim 9, wherein the friction model is based on a first boom joint angle of the first boom segment and a second boom joint angle of the second boom segment.

11. The monitoring system of claim 10, further comprising determining, via the controller, a load limit for the boom based on the first boom joint angle and the second boom joint angle.

12. The monitoring system of claim 11, further comprising determining, via the controller, a load percentage, the load percentage being a percentage of the effective load on the boom with respect to the load limit.

13. The monitoring system of claim 12, further comprising an alert indicator communicatively coupled to the controller for producing an alert when the load percentage exceeds a predetermined limit.

14. The monitoring system of claim 13, further comprising notifying an operator of the boom when the load percentage is within a predetermined margin of the predetermined limit.

15. The monitoring system of claim 10, wherein the friction model is based on one of:
    a) a state of motion of the second boom segment based on the second boom joint angle over time;
    b) a state of motion of the first boom segment based on the first boom joint angle over time, when the second boom segment is static; and c) a last known motion of the second boom segment, when both the second boom segment and the first boom segment are static.

16. The monitoring system of claim 1, wherein determining the effective load on the boom further comprises normalizing the hydraulic fluid pressure from the third pressure sensor and the hydraulic fluid pressure from the fourth pressure sensor with a no-load hydraulic fluid pressure.

17. The monitoring system of claim 1, wherein when the first boom segment and the second boom segment are both outside the at least one portion of the operating range, determining an effective load on the boom based on the fourth pressure sensor.

18. The monitoring system of claim 1, wherein the third pressure sensor is located on the first boom hydraulic cylinder and the fourth pressure sensor is located on the second boom hydraulic cylinder.

\* \* \* \* \*